(12) United States Patent
Yan

(10) Patent No.: US 9,260,540 B1
(45) Date of Patent: Feb. 16, 2016

(54) METHOD OF MAKING A FUNCTIONALIZED POLYMER WITH SULFIDE LINKAGE

(71) Applicant: Bridgestone Corporation, Chuo-ku (JP)

(72) Inventor: Yuan-Yong Yan, Copley, OH (US)

(73) Assignee: Bridgestone Corporation, Tokyo (JP)

( * ) Notice: Subject to any disclaimer, the term of this patent is extended or adjusted under 35 U.S.C. 154(b) by 100 days.

(21) Appl. No.: 13/867,075

(22) Filed: Apr. 20, 2013

Related U.S. Application Data

(60) Provisional application No. 61/636,517, filed on Apr. 20, 2012.

(51) Int. Cl.
*C08F 8/34* (2006.01)
*C08F 36/00* (2006.01)
*C08F 36/06* (2006.01)

(52) U.S. Cl.
CPC .. *C08F 8/34* (2013.01); *C08F 36/06* (2013.01)

(58) Field of Classification Search
USPC ............ 525/326.1, 331.9, 333.3, 333.5, 343, 525/348, 383
See application file for complete search history.

(56) References Cited

U.S. PATENT DOCUMENTS

| | | | |
|---|---|---|---|
| 3,860,566 A | 1/1975 | Zelinski et al. | |
| 4,108,921 A | 8/1978 | Langer, Jr. | |
| 4,169,115 A | 9/1979 | Tung et al. | |
| 4,417,029 A | 11/1983 | Milkovich | |
| 4,544,711 A * | 10/1985 | Mancinelli | 525/348 |
| 4,839,434 A * | 6/1989 | Bronstert et al. | 525/350 |
| 5,627,250 A | 5/1997 | Tsuji et al. | |
| 5,665,829 A * | 9/1997 | Shepherd et al. | 525/332.3 |
| 6,344,510 B1 | 2/2002 | Maruyama et al. | |
| 7,553,925 B2 | 6/2009 | Bojkova | |
| 7,687,597 B2 | 3/2010 | Bojkova | |
| 7,696,296 B2 | 4/2010 | Bojkova | |
| 7,700,686 B2 | 4/2010 | Tanaka et al. | |
| 8,217,103 B2 | 7/2012 | Thiele et al. | |
| 2007/0149744 A1 * | 6/2007 | Yan et al. | 528/38 |

OTHER PUBLICATIONS

C.E. Hoyle et al., "Thiol-click chemistry: a multifaceted toolbox for small molecule and polymer synthesis," Chem. Soc. Rev., vol. 39, pp. 1355-1387 (The Royal Society of Chemistry; London, England; 2010).

J.A. Carioscia et al., "Evaluation and control of thiol-ene/thiol-epoxy hybrid networks," Polymer, vol. 48, pp. 1526-1532 (Elsevier Ltd.; London, England; 2007).

C. Barner-Kowollik et al., "'Clicking' Polymers or Just Efficient Linking: What Is the Difference?," Angew. Chem. Int. Ed., vol. 50, pp. 60-62 (Wiley-VCH Verlag GmbH & Co.; Weinheim, Germany; 2011).

* cited by examiner

*Primary Examiner* — Irina S Zemel
*Assistant Examiner* — Jeffrey Lenihan
(74) *Attorney, Agent, or Firm* — Meredith E. Hooker; David G. Burleson

(57) ABSTRACT

A carbanionic polymer chain that contains polyene mer can be provided with a terminal functionality separated from the polymer chain by a sulfide linkage. The terminally functionalized polymer can be provided by reacting a carbanionic polyene-based polymer with an episulfide compound to provide a polymer with a terminal thiolate moiety, followed by reaction with an epoxide compound that also includes at least one other heteroatom-containing functional group.

15 Claims, No Drawings

METHOD OF MAKING A FUNCTIONALIZED POLYMER WITH SULFIDE LINKAGE

CROSS-REFERENCE TO RELATED APPLICATION

This application claims the benefit of U.S. provisional patent application No. 61/636,517, filed Apr. 20, 2013, the disclosure of which is incorporated herein by reference.

BACKGROUND INFORMATION

Rubber goods such as tire treads often are made from elastomeric compositions that contain one or more reinforcing materials such as, for example, particulate carbon black and silica; see, e.g., *The Vanderbilt Rubber Handbook*, 13th ed. (1990), pp. 603-04.

Good traction and resistance to abrasion are primary considerations for tire treads; however, motor vehicle fuel efficiency concerns argue for a minimization in their rolling resistance, which correlates with a reduction in hysteresis and heat build-up during operation of the tire. Reduced hysteresis and traction are, to a great extent, competing considerations: treads made from compositions designed to provide good road traction usually exhibit increased rolling resistance and vice versa. Filler(s), polymer(s), and additives typically are chosen so as to provide an acceptable compromise or balance of these properties. Ensuring that reinforcing filler(s) are well dispersed throughout the elastomeric material(s) both enhances processability and acts to improve physical properties. Dispersion of fillers can be improved by increasing their interaction with the elastomer(s).

Certain tests have come to be recognized as correlating certain physical properties of vulcanizates with performance of products, particularly tire treads, made therefrom. For example, higher rebound values and lower loss tangent values (tan δ) at high temperatures have been found to correlate with reductions in heat build-up during operation (hysteresis), higher elastic modulus values at high temperature and strain with better handling performance, and lower modulus values at low temperatures with wet, snow and ice traction. (In the foregoing, "high temperatures" usually are considered to be from ~50° to ~65° C. while "low temperatures" from ~0° to –25° C.)

The section of a polymer chain from the site of the last crosslink to an end of the polymer chain is a major source of hysteretic loss; because a free end is not tied to the macromolecular network, it cannot be involved in an efficient elastic recovery process and, as a result, energy transmitted to this section of the polymer (and vulcanizates in which such a polymer is incorporated) is lost as heat. Ensuring that polymer chain ends are tied to, or otherwise interact well with, reinforcing particulate fillers, is important to many vulcanizate physical properties such as, for example, reduced hysteresis. Chemically modifying the polymer, typically at a terminus thereof, is an effective way of increasing interactivity of fillers and polymers.

Sequential reaction sequences employing siloxanes to provide living polymers with terminal functionality have been described in U.S. Pat. No. 8,063,153 and international patent publ. no. WO 2012/092595. The former also describes that an episulfide compound can be used in place of the cyclic siloxane in the first step of the sequential termination process.

SUMMARY

Provided herein are methods for making polymers with terminal functionality. The terminal functionality includes at least one heteroatom and is connected to the polymer chain through a sulfide segment.

The method can involve reacting a carbanionic (living) polyene-based polymer with an episulfide compound to provide a polymer with a terminal thiolate moiety, followed by reaction with an epoxide compound that also includes at least one other heteroatom-containing functional group. One of the additional functional group(s) advantageously can be an alkoxysilane or epoxy group.

The resulting polymer product can be represented by the formula

where E is an elastomer, such as a polymer that contains polyene mer, particularly diene mer; A is an intermediate segment or group that includes a sulfur atom at the end distal from E and proximal to $G_t$; and $G_t$ is the radical of an epoxide that also includes at least one other heteroatom-containing functional group. The $G_t$ unit includes a hydroxyl group at the β position (relative to the S atom) and at least one heteroatom-containing functional group distal therefrom (relative to its connection point with A).

Where a heteroatom-containing functional group of $G_t$ in the formula (I)-type polymer is an epoxy group, it can be further reacted with a compound that includes an epoxy-reactive group. This can result in a polymer of the formula

where E and A are defined as above, $G_e$ is the radical of a polyepoxide that includes a hydroxyl group at the β position relative to the sulfur atom, and $G_r$ is the radical of a compound that comprises an epoxy-reactive group and at least one heteroatom-containing functional group.

The polymer chains include polyene mer units. In certain embodiments, the polyenes can be conjugated dienes. In these and other embodiments, where other types of monomers are copolymerized with the polyene(s), the polyene mer can incorporate substantially randomly along the polymer chain. In each aspect, the polymer can be substantially linear.

Compositions, including vulcanizates, that include particulate fillers and terminally functionalized polymers also are provided, as are methods of providing and using such compositions.

Other aspects of the invention will be apparent to the ordinarily skilled artisan from the detailed description that follows. To assist in understanding that description, certain definitions are provided immediately below, and these are intended to apply throughout unless the surrounding text explicitly indicates a contrary intention:

"polymer" means the polymerization product of one or more monomers and is inclusive of homo-, co-, ter-, tetra-polymers, etc.;

"mer" or "mer unit" means that portion of a polymer derived from a single reactant molecule (e.g., ethylene mer has the general formula —$CH_2CH_2$—);

"copolymer" means a polymer that includes mer units derived from two reactants, typically monomers, and is inclusive of random, block, segmented, graft, etc., copolymers;

"interpolymer" means a polymer that includes mer units derived from at least two reactants, typically monomers, and is inclusive of copolymers, terpolymers, tetra-polymers, and the like;

"substituted" means one containing a heteroatom or functionality (e.g., hydrocarbyl group) that does not interfere with the intended purpose of the group in question;

"directly bonded" means covalently attached with no intervening atoms or groups;

"polyene" means a molecule, typically a monomer, with at least two double bonds located in the longest portion or chain thereof, and specifically is inclusive of dienes, trienes, and the like;

"polydiene" means a polymer that includes mer units from one or more dienes;

"phr" means parts by weight (pbw) per 100 pbw rubber;

"radical" means the portion of a molecule that remains after reacting with another molecule, regardless of whether any atoms are gained or lost as a result of the reaction;

"terminus" means an end of a polymeric chain;

"terminally active" means a polymer with a living terminus; and

"terminal moiety" means a group or functionality located at a terminus.

Throughout this document, all values given in the form of percentages are weight percentages unless the surrounding text explicitly indicates a contrary intention. All referenced patent documents are incorporated herein by reference.

DETAILED DESCRIPTION OF ILLUSTRATIVE EMBODIMENTS

As summarily described in the previous section, the present method involves sequentially reacting a carbanionic (living) diene-based polymer with an episulfide compound followed by an epoxide compound that also includes at least one other heteroatom-containing functional group. The result is a polymer that contains a heteroatom-rich terminus that can interact well with reinforcing particulate fillers, a property that permits vulcanizates made therefrom to exhibit reduced hysteresis relative to similar polymer not containing such a terminus.

The polymers include mer units derived from polyenes, particularly dienes and trienes (e.g., myrcene). Illustrative polyenes include $C_4$-$C_{12}$ dienes, particularly conjugated dienes such as, but not limited to, 1,3-butadiene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, and the like.

Polyenes can incorporate into polymeric chains in more than one way. Especially for tire tread applications, controlling this manner of incorporation can be desirable. A polymer chain with an overall 1,2-microstructure, given as a numerical percentage based on total polyene content, of from ~10 to ~80%, optionally from ~25 to ~65%, sometimes can be desirable. A polymer that has an overall 1,2-microstructure of no more than ~50%, typically no more than ~45%, more typically no more than ~40%, even more typically no more than ~35%, and commonly no more than ~30%, based on total polyene content, is considered to be "substantially linear". For certain end use applications, however, keeping the content of 1,2-linkages even lower—e.g., to less than ~7%, less than 5%, less than 2%, or less than 1%—can be desirable.

Depending on the intended end use, one or more of the polymer chains can include pendent aromatic groups, which can be provided, for example, through incorporation of mer units derived from vinyl aromatics, particularly the $C_8$-$C_{20}$ vinyl aromatics such as styrene, α-methyl styrene, p-methyl styrene, the vinyl toluenes, the vinyl naphthalenes, and the like. When used in conjunction with one or more polyenes, mer units with pendent aromatic groups can constitute from ~1 to ~50%, from ~10 to ~45%, or from ~20 to ~35%, of the polymer chain; the microstructure of such interpolymers can be random, i.e., the mer units derived from each type of constituent monomer do not form blocks and, instead, are incorporated in an essentially nonrepeating manner. Random microstructure can provide particular benefit in some end use applications such as, e.g., rubber compositions used in the manufacture of tire treads.

Exemplary elastomers include interpolymers of one or more polyenes and styrene such as, e.g., poly(styrene-co-butadiene), also known as SBR.

The number average molecular weight ($M_n$) of the polymer typically is such that a quenched sample exhibits a gum Mooney viscosity ($ML_4$/100° C.) of from ~2 to ~150, more commonly from ~2.5 to ~125, even more commonly from ~5 to ~100, and most commonly from ~10 to ~75.

The foregoing types of polymers can be made by emulsion polymerization or solution polymerization, with the latter affording greater control with respect to such properties as randomness, microstructure, etc. Solution polymerizations have been performed since about the mid-20th century, so the general aspects thereof are known to the ordinarily skilled artisan; nevertheless, certain aspects are provided here for convenience of reference.

Useful polymerization solvents include various $C_5$-$C_{12}$ cyclic and acyclic alkanes as well as their alkylated derivatives, certain liquid aromatic compounds, and mixtures thereof. The ordinarily skilled artisan is aware of other useful solvent options and combinations.

Solution polymerization typically involves an initiator such as an alkali metal atom containing compound such as an organolithium compound, particularly alkyllithium compounds. Examples of organolithium initiators include N-lithio-hexamethyleneimine; n-butyllithium; tributyltin lithium; dialkylaminolithium compounds such as dimethylaminolithium, diethylaminolithium, dipropylaminolithium, dibutylaminolithium and the like; dialkylaminoalkyllithium compounds such as diethylaminopropyllithium; and those trialkyl stanyl lithium compounds involving $C_1$-$C_{12}$, preferably $C_1$-$C_4$, alkyl groups.

So-called functionalized initiators also can be useful and sometimes even preferred. These become incorporated into the polymer chain, thus providing a heteroatom-containing functional group at the initiated end of the chain. Examples of such materials include lithiated aryl thioacetals (see, e.g., U.S. Pat. No. 7,153,919) and the reaction products of organolithium compounds and, for example, N-containing organic compounds such as substituted aldimines, ketimines, secondary amines, etc., optionally pre-reacted with a compound such as diisopropenyl benzene (see, e.g., U.S. Pat. Nos. 5,153,159 and 5,567,815).

Other potentially useful functional initiators include sulfur atom-containing cyclic compounds such as those described in U.S. Pat. No. 7,612,144, which are defined by the general formula

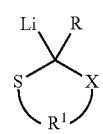

(II)

where $R^1$ is a $C_2$-$C_8$ alkylene group; X is S, O or NR; and R is a substituted or unsubstituted $C_1$-$C_6$ trialkylsilyl group, $C_1$-$C_{20}$ alkyl group, $C_4$-$C_{20}$ cycloalkyl group, $C_6$-$C_{20}$ aryl group, thienyl, furyl, or pyridyl group.

Also potentially useful as functional initiators are cyclic compounds such as those described in U.S. Pat. No. 8,227,562, defined by the general formula

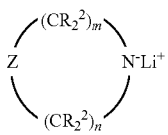
(III)

where each $R^2$ independently is H or a $C_1$-$C_6$ alkyl group; m is an integer of from 0 to 4 inclusive and n is an integer of from 1 to 4 inclusive, with the proviso that m+n≥2; and Z is $NR^3$, $PR^4$, $SiR^4R^5$, $SnR^4R^5$, or $CR^4R^6$ wherein $R^3$ is a substituted or unsubstituted hydrocarbyl group that is free of active hydrogen atoms (but which optionally can include at least one N, P, O, S, Si or Sn atom), $R^4$ is an $R^3$ group which includes at least one N, P, O, S, Si or Sn atom, $R^5$ is a $C_1$-$C_6$ alkyl group, and $R^6$ is $R^2$ or, together with $R^4$ and the C atom to which it is bonded, forms a substituted or unsubstituted cycloalkyl group.

Also potentially useful as functional initiators are compounds such as those described in U.S. Pat. Publ. No. 2010/0286348 A1, defined by the general formula $$R^7Z'Q\text{-}M \qquad (IV)$$

where M is an alkali metal atom, preferably Li, Na or K; $R^7$ is a substituted or unsubstituted aryl group (which can be a single phenyl-type group or a ring system) having at least one $OR^8$ substituent group where each $R^8$ is a group that is non-reactive toward M and capable of being hydrolyzed; Z' is a single bond or a substituted or unsubstituted alkylene (acyclic or cyclic) or arylene group; and Q is a group bonded to M through a C, N or Sn atom.

Also potentially useful as functional initiators are cyclic compounds such as those described in U.S. Pat. Publ. No. 2012/0136128, defined by the general formula

(V)

where M is an alkali metal atom, preferably Li, Na or K; $R^9$ is an aryl group that includes at least one $OR^8$ substituent group with $R^8$ being defined as above; and $R^3$ is defined as above.

Also potentially useful as functional initiators are para-substituted styrenic compounds that have been reacted with an alkali metal atom-containing compound, which can be represented by formula (V) above with the proviso that $R^9$ here is defined as a phenyl group substituted at the para position with a linear or cyclic group that contains at least one O, S, N, P or Si atom. Non-limiting examples of compounds that can be reacted with an alkali metal atom-containing compound (e.g., a hydrocarbyllithium) include, but are not limited to,

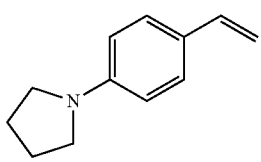

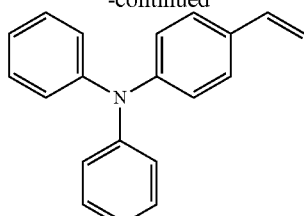

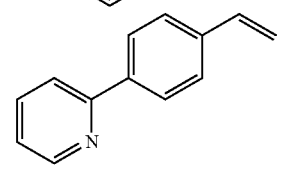

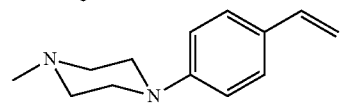

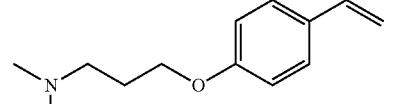

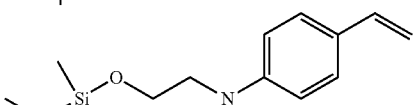

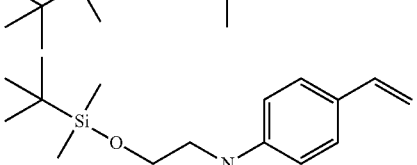

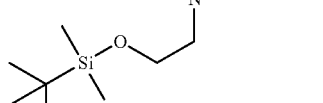

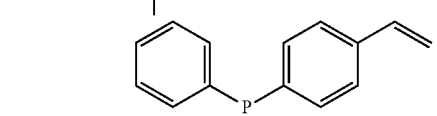

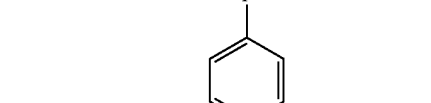

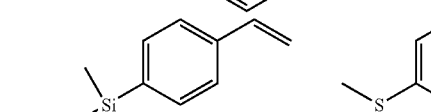

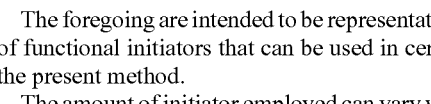

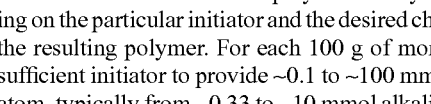

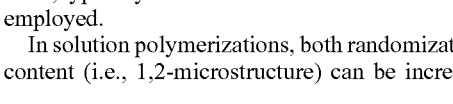

The foregoing are intended to be representative of the types of functional initiators that can be used in certain aspects of the present method.

The amount of initiator employed can vary widely depending on the particular initiator and the desired characteristics of the resulting polymer. For each 100 g of monomer present, sufficient initiator to provide ~0.1 to ~100 mmol alkali metal atom, typically from ~0.33 to ~10 mmol alkali metal atom, is employed.

In solution polymerizations, both randomization and vinyl content (i.e., 1,2-microstructure) can be increased through inclusion of a coordinator, usually a polar compound, in the polymerization ingredients. Up to 90 or more equivalents of coordinator can be used per equivalent of initiator, with the amount depending on, e.g., the amount of vinyl content desired, the level of non-polyene monomer employed, the reaction temperature, and nature of the specific coordinator employed. Compounds useful as coordinators include organic compounds that include a heteroatom having a non-bonded pair of electrons (e.g., O or N). Examples include dialkyl ethers of mono- and oligo-alkylene glycols; crown ethers; tertiary amines such as tetramethylethylene diamine; THF; THF oligomers; linear and cyclic oligomeric oxolanyl alkanes (see, e.g., U.S. Pat. No. 4,429,091) such as 2,2-bis(2'-tetrahydrofuryl)propane, di-piperidyl ethane, hexamethylphosphoramide, N,N'-dimethylpiperazine, diazabicyclooctane, diethyl ether, tributylamine, and the like.

Although the ordinarily skilled artisan understands the conditions typically employed in solution polymerization, a representative description is provided for convenience of the reader. The following is based on a batch process, although extending this description to, e.g., semi-batch or continuous processes is within the capability of the ordinarily skilled artisan.

Solution polymerization typically begins by charging a blend of monomer(s) and solvent to a suitable reaction vessel, followed by addition of a coordinator (if used) and initiator, which often are added as part of a solution or blend; alternatively, monomer(s) and coordinator can be added to the initiator. The procedure typically is carried out under anhydrous, anaerobic conditions. The reactants can be heated to a temperature of up to ~150° C. and agitated. After a desired degree of conversion has been reached, the heat source (if used) can be removed and, if the reaction vessel is to be reserved solely for polymerizations, the reaction mixture is removed to a post-polymerization vessel for functionalization and/or quenching. At this point, the reaction mixture commonly is referred to as a "polymer cement" because of its relatively high concentration of polymer.

Generally, polymers made according to anionic techniques can have a $M_n$ of from ~50,000 to ~500,000 Daltons, although in certain embodiments the number average molecular weight can range from ~75,000 to ~250,000 Daltons or even from ~90,000 to ~150,000 Daltons.

The aforedescribed polymerization process advantageously results in carbanionic polymer chains that possess reactive (living) terminals, which can undergo further reaction(s) that can enhance the interaction between the polymer chains and particulate fillers in rubber compounds, thereby improving the mechanical and dynamic properties of vulcanizates made therefrom.

One such reaction is accomplished by introducing an episulfide compound to the carbanionic polymer. This can be done in the vessel where the polymerization was performed or in a separate vessel.

Specific examples of potentially useful episulfide compounds include ethylene sulfide, propylene sulfide, 2,3-butylene sulfide, and the like. Such compounds can be generally represented as

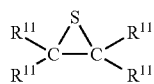

(VI)

where each $R^{11}$ independently is a hydrogen atom or a $C_1$-$C_6$ hydrocarbyl group, preferably an alkyl group. The reactivity of such compounds generally increases as the size of the episulfide decreases, i.e., when each $R^{11}$ is a hydrogen atom or a small (e.g., $C_1$-$C_2$) alkyl group.

Given the foregoing structure and the definitions of the variables, the ordinarily skilled artisan can envision numerous species defined by this structure.

The thiolate product of the foregoing reaction can be represented as $$G_i\text{-}\pi\text{-}R^{10}S^- \qquad (VII)$$

where $G_i$ represents the radical of an initiator, preferably a functional initiator; π represents a polymer chain that includes polyene mer; and $R^{10}$ is a substituted or unsubstituted $C_2$-$C_{10}$, preferably $C_2$-$C_6$, alkylene group. The anionic charge formerly associated with the carbanionic polymer now resides on the S atom; hence, the intermediate functionalized polymer remains available for further reaction.

No particularly unusual reaction conditions are believed necessary to accomplish the foregoing reaction, i.e., the conditions used to provide the living polymer typically are adequate to open the ring of the cyclic structure and allow the resulting radical to attach to the polymer terminus. Reaction of the foregoing types of episulfides with a terminally active polymer can be performed in less than ~100 minutes, often fewer than ~50 minutes, at moderate temperatures, e.g., 0° to 75° C. Reaction typically occurs between a C atom of the polymer chain and a C atom of the cyclic portion of the compound. Because of the reactivity of carbanionic polymers, the molar or equivalent amount of functionalizing compound need be no greater than ~1:1 relative to the amount of initiator employed in the polymerization, although higher ratios certainly can be employed if a larger intermediate moiety (i.e., more than one unit derived from the opening of the cyclic compound and attachment of its radical to the polymer chain) is desired.

The thiolate of formula (VII) is capable of further reaction. For example, U.S. Pat. No. 8,063,153 describes that thiolates resulting from the reaction of episulfide compounds with carbanionic polymers can be reacted with alkoxysilanes, halogens, anhydrides, amines, amides, cyanides, and sultones.

Here, advantages have been found in reacting a polymeric thiolate with an epoxide. Exemplary epoxides include those defined by the general formulas

 (VIII-a)

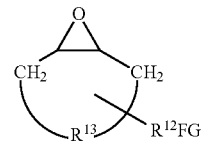 (VIII-b)

where FG is a heteroatom-containing functional group (S preferably is not the heteroatom or, if present, not the only heteroatom in the functional group), particularly, but not necessarily exclusively, a siloxane or epoxy group; $R^{12}$ is a hydrocarbylene group, optionally substituted with one or more heteroatoms (e.g., O, S, N, etc.) and/or one or more heteroatom-containing groups (i.e., additional FG's); and $R^{13}$ is a substituted or unsubstituted $C_1$-$C_4$ alkylene group that acts to bridge the methylene groups at each of its ends so as to form a cyclic structure that optionally can include a heteroatom in the ring. Representative examples of (VIIIa)- and (VIIIb)-type epoxides are provided below in the examples; in view of those specific examples and the generic structures provided in formulas (VIIIa) and (VIIIb), the ordinarily skilled artisan can envision scores of specific epoxides that can be used in the step that provides terminal functionality to the polymer.

One subset of formula (VIIIa)-type epoxides of particular interest includes those where FG represents another epoxy group. Representative examples of polyepoxides include, but are not limited to,

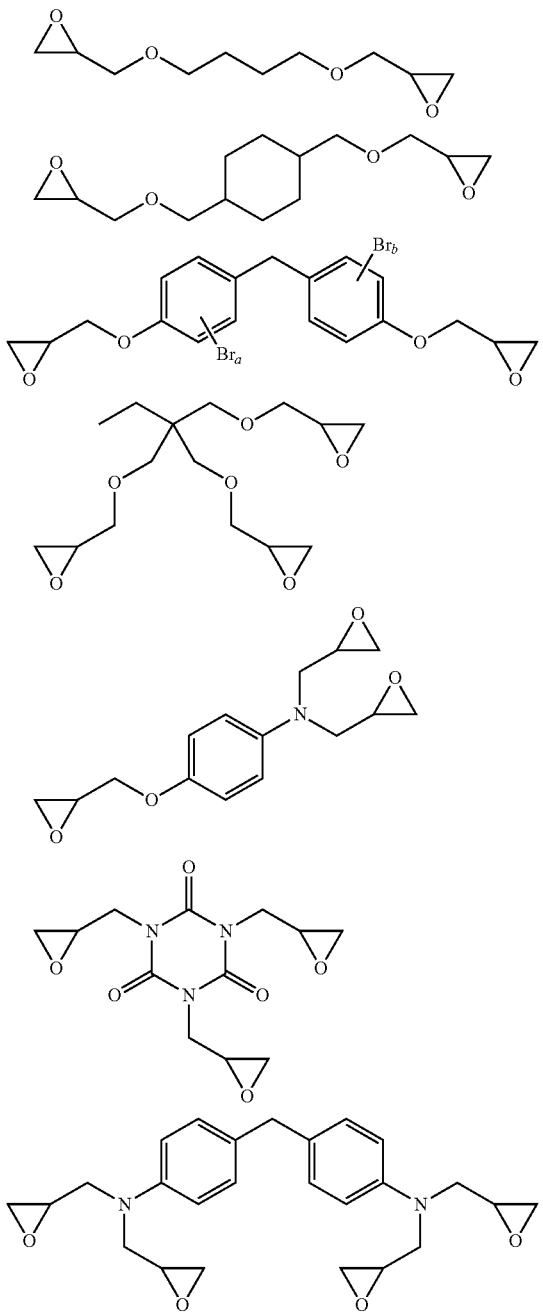

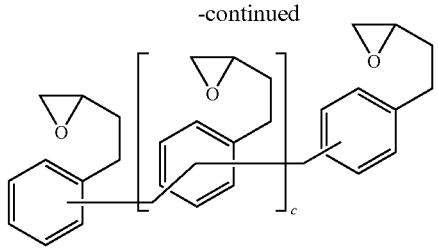

where a and b independently can be an integer of from 0 to 4 inclusive and c represents an integer of from 1 to 2000, commonly 2 to 1500 and typically 3 to 1000.

Quenching can be conducted by stirring an active hydrogen atom-containing compound, such as an alcohol or acid, into the polymer cement for up to ~120 minutes at temperatures of from ~25° to ~150° C. The quenching process can result in any anionic epoxy O atom being hydrogenated so as to provide a hydroxyl group.

The product of the foregoing functionalization reaction, after quenching, can be represented as $$G_i\text{-}\pi\text{-}R^{10}SG_t \qquad (IX)$$

where $G_i$, $\pi$ and $R^{10}$ are defined as above and $G_t$ is a terminal moiety that is the neutralized (H-atom modified) radical of a formula (VIIIa)- or (VIIIb)-type epoxide, having a hydroxyl group substituent at the β carbon atom relative to the S atom of the sulfide linkage. A distal end of the $G_t$ moiety includes at least one FG (defined above).

In at least some embodiments of a formula (IX)-type polymer, the β position relative to the hydroxyl group-substituted C atom can be a heteroatom, particularly an O atom.

The molecular weight of the terminal functionality ($G_t$) ranges from a few dozen to no more than a few hundred g/mol, which is relatively small compared to the molecular weight of the polyene (inter)polymer.

Where a polyepoxide is employed in the reaction with the thiolate of formula (VII), one or more of the remaining epoxy groups are available for further reaction with an epoxy-reactive compound, i.e., a compound that includes one or more epoxy-reactive groups (e.g., —NH₂, —OH, —SH, etc.). Non-limiting examples of epoxy-reactive compounds include

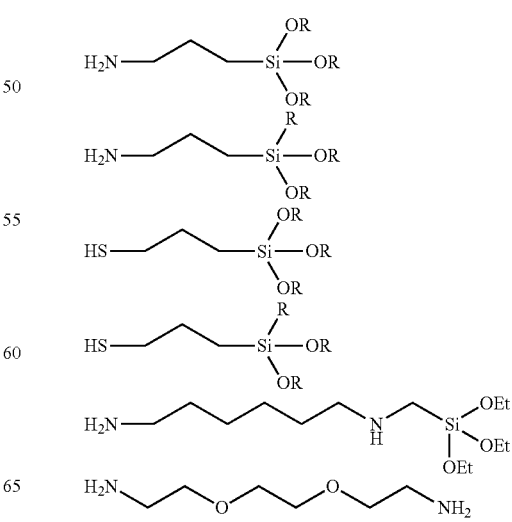

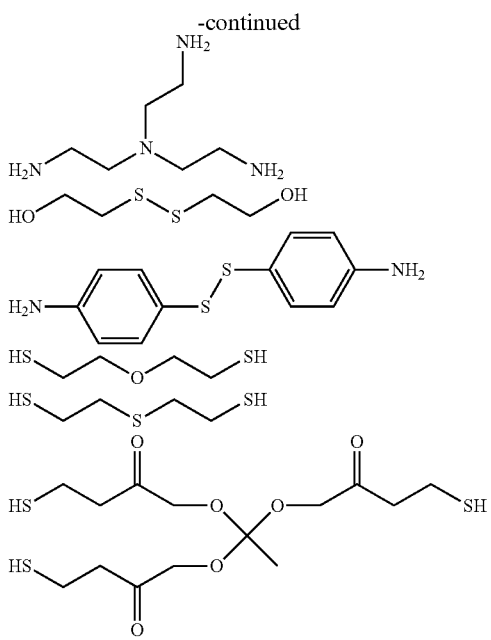

The reaction products of such compounds with terminally functional polymers can result in formula (Ia)-type functionalized polymers.

The product of the aforedescribed sequential reaction series, after quenching, can be represented as $$G_i\text{-}\pi\text{-}R^{10}SG_e\text{-}G_r \tag{X}$$

where $G_i$, $\pi$ and $R^{10}$ are defined as above, $G_e$ is the radical of a polyepoxide that includes a hydroxyl group at the position relative to the sulfur atom, and $G_r$ is the neutralized (H-atom modified) radical of a compound that includes an epoxy-reactive group and at least one heteroatom-containing functional group. A distal end of the $G_r$ moiety includes at least one FG (defined above).

In addition to assisting in increasing interactivity with particulate fillers when the polymer is compounded, i.e., included in a rubber composition, and formed into a vulcanizate, providing the aforementioned terminal functionalization can significantly improve cold flow performance of the polymer. Exemplary improvements that can be achieved are set forth in the examples that follow.

Solvent can be removed from the quenched polymer cement by any of a variety of techniques such as drum drying, extruder drying, vacuum drying or the like, which may be combined with coagulation with water, alcohol or steam, thermal desolvation, etc.; if coagulation is performed, oven drying may be desirable.

The resulting polymer can be utilized in a tread stock compound or can be blended with any type of tread stock rubber including natural rubber and/or non-functionalized synthetic rubbers such as, e.g., one or more of homo- and interpolymers that include just polyene-derived mer units (e.g., polybutadiene, polyisoprene, and copolymers incorporating butadiene, isoprene, and the like), SBR, butyl rubber, neoprene, EPR, EPDM, acrylonitrile/butadiene rubber (NBR), silicone rubber, fluoroelastomers, ethylene/acrylic rubber, EVA, epichlorohydrin rubbers, chlorinated polyethylene rubbers, chlorosulfonated polyethylene rubbers, hydrogenated nitrile rubber, tetrafluoroethylene/propylene rubber and the like. When a functionalized polymer(s) is blended with conventional rubber(s), the amounts can vary from ~5 to ~99% of the total rubber, with the conventional rubber(s) making up the balance of the total rubber. The minimum amount depends to a significant extent on the degree of hysteresis reduction desired.

Amorphous silica ($SiO_2$) can be utilized as a filler. Silicas are generally classified as wet-process, hydrated silicas because they are produced by a chemical reaction in water, from which they are precipitated as ultrafine, spherical particles. These primary particles strongly associate into aggregates, which in turn combine less strongly into agglomerates. "Highly dispersible silica" is any silica having a very substantial ability to de-agglomerate and to disperse in an elastomeric matrix, which can be observed by thin section microscopy.

Surface area gives a reliable measure of the reinforcing character of different silicas; the Brunauer, Emmet and Teller ("BET") method (described in *J. Am. Chem. Soc.*, vol. 60, p. 309 et seq.) is a recognized method for determining surface area. BET surface area of silicas generally is less than 450 $m^2/g$, and useful ranges of surface include from ~32 to ~400 $m^2/g$, ~100 to ~250 $m^2/g$, and ~150 to ~220 $m^2/g$.

The pH of the silica filler is generally from ~5 to ~7 or slightly over, preferably from ~5.5 to ~6.8.

Some commercially available silicas which may be used include Hi-Sil™ 215, Hi-Sil™ 233, and Hi-Sil™ 190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J.M. Huber Corp. (Edison, N.J.).

Silica can be employed in the amount of ~1 to ~100 phr, preferably in an amount from ~5 to ~80 phr. The useful upper range is limited by the high viscosity that such fillers can impart.

Other useful fillers include all forms of carbon black including, but not limited to, furnace black, channel blacks and lamp blacks. More specifically, examples of the carbon blacks include super abrasion furnace blacks, high abrasion furnace blacks, fast extrusion furnace blacks, fine furnace blacks, intermediate super abrasion furnace blacks, semi-reinforcing furnace blacks, medium processing channel blacks, hard processing channel blacks, conducting channel blacks, and acetylene blacks; mixtures of two or more of these can be used. Carbon blacks having a surface area (EMSA) of at least 20 $m^2/g$, preferably at least ~35 $m^2/g$, are preferred; surface area values can be determined by ASTM D-1765 using the CTAB technique. The carbon blacks may be in pelletized form or an unpelletized flocculent mass, although unpelletized carbon black can be preferred for use in certain mixers.

The amount of carbon black can be up to ~50 phr, with ~5 to ~40 phr being typical. When carbon black is used with silica, the amount of silica can be decreased to as low as ~1 phr; as the amount of silica decreases, lesser amounts of the processing aids, plus silane if any, can be employed.

Elastomeric compounds typically are filled to a volume fraction, which is the total volume of filler(s) added divided by the total volume of the elastomeric stock, of ~25%; accordingly, typical (combined) amounts of reinforcing fillers, i.e., silica and carbon black, is ~30 to 100 phr. In certain embodiments, the amount of silica relative to the total amount of particulate filler can be below 50%, below ~45%, below ~40%, or even below ~35%.

When silica is employed as a reinforcing filler, addition of a coupling agent such as a silane is customary so as to ensure good mixing in, and interaction with, the elastomer(s). Generally, the amount of silane that is added ranges between ~4 and 20%, based on the weight of silica filler present in the elastomeric compound.

Coupling agents can have a general formula of $G_f$-T-$G_s$, in which $G_f$ represents a functional group capable of bonding physically and/or chemically with a group on the surface of the silica filler (e.g., surface silanol groups); T represents a hydrocarbon group linkage; and $G_s$ represents a functional group capable of bonding with the elastomer (e.g., via a sulfur-containing linkage). Such coupling agents include organosilanes, in particular polysulfurized alkoxysilanes (see, e.g., U.S. Pat. Nos. 3,873,489, 3,978,103, 3,997,581, 4,002,594, 5,580,919, 5,583,245, 5,663,396, 5,684,171, 5,684,172, 5,696,197, etc.) or polyorganosiloxanes bearing the $G_f$ and $G_s$ functionalities mentioned above. An exemplary coupling agent is bis[3-(triethoxysilyl)propyl]-tetrasulfide.

Addition of a processing aid can be used to reduce the amount of silane employed. See, e.g., U.S. Pat. No. 6,525,118 for a description of fatty acid esters of sugars used as processing aids. Additional fillers useful as processing aids include, but are not limited to, mineral fillers, such as clay (hydrous aluminum silicate), talc (hydrous magnesium silicate), and mica as well as non-mineral fillers such as urea and sodium sulfate. Preferred micas contain principally alumina, silica and potash, although other variants also can be useful. The additional fillers can be utilized in an amount of up to ~40 phr, typically up to ~20 phr.

Other conventional rubber additives also can be added. These include, for example, process oils, plasticizers, anti-degradants such as antioxidants and antiozonants, curing agents and the like.

All of the ingredients can be mixed using standard equipment such as, e.g., Banbury or Brabender mixers. Typically, mixing occurs in two or more stages. During the first stage (often referred to as the masterbatch stage), mixing typically is begun at temperatures of ~120° to ~130° C. and increases until a so-called drop temperature, typically ~165° C., is reached.

Where a formulation includes silica, a separate re-mill stage often is employed for separate addition of the silane component(s). This stage often is performed at temperatures similar to, although often slightly lower than, those employed in the masterbatch stage, i.e., ramping from ~90° C. to a drop temperature of ~150° C.

Reinforced rubber compounds conventionally are cured with ~0.2 to ~5 phr of one or more known vulcanizing agents such as, for example, sulfur or peroxide-based curing systems. For a general disclosure of suitable vulcanizing agents, the interested reader is directed to an overview such as that provided in Kirk-Othmer, *Encyclopedia of Chem. Tech.*, 3d ed., (Wiley Interscience, New York, 1982), vol. 20, pp. 365-468. Vulcanizing agents, accelerators, etc., are added at a final mixing stage. To ensure that onset of vulcanization does not occur prematurely, this mixing step often is done at lower temperatures, e.g., starting at ~60° to ~65° C. and not going higher than ~105° to ~110° C.

The following non-limiting, illustrative examples provide detailed conditions and materials that can be useful in the practice of the present invention.

Each of the polymers employed in these examples is a random styrene/butadiene copolymer made using an alkyllithium initiator, choices made based on convenience and an ability to make meaningful comparisons of the functionalities attached to each. This should not be read as limiting the types of initiators and/or (inter)polymers that can be employed in the process; functional initiators of the types set forth above (and obvious variants) and all polymers the same or similar to those mentioned previously can be used in practicing the inventive method.

EXAMPLES

In the following examples, dried glass vessels previously sealed with extracted septum liners and perforated crown caps under a positive $N_2$ purge were used for all preparations unless otherwise indicated.

Butadiene solution (varying percentages in hexane), styrene solution (33.5% in hexane), hexane, n-butyllithium (1.6 M in hexane), 2,2-bis(2'-tetrahydrofuryl)propane (1.6 M solution in hexane, stored over $CaH_2$), and butylated hydroxytoluene (BHT) solution in hexane were used in the polymerizations.

Commercially available reagents and starting materials included the following, all of which were acquired from Sigma-Aldrich Co. (St. Louis, Mo.) and used without further purification unless otherwise noted in a specific example: ethylene sulfide (98% purity), N,N-diglycidyl-4-glycidyloxyaniline (DGCGOA), trimethylolpropane triglycidyl ether (TMPTGE), 4,4'-methylenebis(N,N-diglycidylaniline), tri-methoxy[2-(7-oxabicyclo[4.1.0]hept-3-yl)ethyl]-silane (TMSOES, 98% purity), (3-glycidyloxypropyl)trimethoxysilane (3-GOP-3, 98% purity), (3-aminopropyl) trimethoxysilane (APTEOS), N-(6-aminohexyl) aminomethyltriethoxysilane (AHAMTEOS), and 2,2'-(ethylenedioxy)-bis(ethylamine) (EDOEA).

Examples 1-2

Control and Comparative Interpolymers

To a $N_2$-purged reactor equipped with a stirrer was added 1.75 kg hexane, 0.45 kg styrene solution, and 2.75 kg butadiene solution (21.8% in hexane). The reactor was charged with ~3.9 mL n-butyllithium solution, followed by 1.2 mL 2,2-bis(2'-tetrahydrofuryl)propane solution. The reactor jacket was heated to 50° C. and, after ~34 minutes, the batch temperature peaked at ~63° C.

After an additional ~30 minutes, portions of the polymer cement were dropped into glass bottles, one containing isopropanol (sample 1, control) and the other containing a 2.99 M solution of 3-(1,3-dimethylbutylidene)aminopropyltriethoxysilane (Chisso Corp.; Rye, N.Y.) (sample 2, comparative). The bottles were placed in a 50° C. water bath for ~30 minutes.

Each polymer cement was dropped into isopropanol containing BHT, and the coagulated polymers were drum dried. Properties of these polymers are summarized below in Table 1, where $M_p$ represents peak molecular weight.

Examples 3-5

Control and Comparative Interpolymers

The procedure from Example 1 was essentially repeated. To the same type of reactor was added 1.77 kg hexane, 0.45 kg styrene solution, and 2.72 kg butadiene solution (22.0% in hexane). The reactor was charged with ~3.9 mL n-butyllithium solution, followed by 1.2 mL 2,2-bis(2'-tetrahydrofuryl)propane solution. The reactor jacket was heated to 50° C. and, after ~34 minutes, the batch temperature peaked at ~63° C.

After an additional ~30 minutes, portions of the polymer cement were dropped into glass bottles containing, respectively sample 3—isopropanol (control),
sample 4—4.5 M 3-GOP-3 (comparative), and
sample 5—4.3 M TMSOES (comparative).

(The amounts of 3-GOP-3 and TMSOES added to samples 3 and 4 were designed to provide a 1:1 molar ratio of functional terminator compound to Li initiator.) The bottles were placed in a 50° C. water bath for ~30 minutes.

Each polymer cement was coagulated and drum dried as in Examples 1-2. Properties of these polymers also are summarized below in Table 1.

Examples 6-9

Interpolymers with Terminal Functionalities Linked Via Sulfide Moiety

The procedure from Example 1 again was essentially repeated. To the same type of reactor was added 1.75 kg hexane, 0.45 kg styrene solution, and 2.75 kg butadiene solution (21.8% in hexane). The reactor was charged with ~4.2 mL n-butyllithium solution, followed by 1.2 mL 2,2-bis(2'-tetrahydrofuryl)propane solution. The reactor jacket was heated to 50° C. and, after ~30 minutes, the batch temperature peaked at ~64° C.

After ~30 minutes, a solution of 0.41 mL ethylene sulfide (16.4 M) in 10 mL hexane was charged to the reactor and stirred at 50° C. for an additional 30 minutes.

After an additional ~30 minutes, portions of the polymer cement were dropped into glass bottles containing, respectively sample 6—isopropanol,
sample 7—2.2 M DGCGOA,
sample 8—2.2 M TMPTGE,
sample 9—4.3 M TMSOES, and
sample 10—4.5 M 3-GOP-3.

(The amounts of functional terminating compounds were calculated to provide a 1:1 molar ratio of functional terminator compound to Li initiator.) The bottles were placed in a 50° C. water bath for ~30 minutes.

Each polymer cement was coagulated and drum dried as in Examples 1-2. Properties of these polymers also are summarized below in Table 1.

Mooney viscosity ($ML_{1+4}$ and $t_{80}$) values were determined at 100° C. with an Alpha Technologies™ Mooney viscometer (large rotor) using a one-minute warm-up time and a four-minute running time.

Cold flow testing was performed using a Scott™ tester. Samples were prepared by melt pressing 2.5 g of polymer at 100° C. for 20 minutes in a mold using a preheated press. The resulting cylindrical samples, which had a uniform thickness of ~12 mm, were allowed to cool to room temperature before being removed from the mold. Samples were placed individually under the weight of a 5 kg calibrated weight. Sample thicknesses were recorded as a function of time for ~30 minutes, measured from time that the weight was released, with the values in the following table being thicknesses at the conclusion of the tests.

TABLE 1

Properties of polymers from Examples 1-10

| | 1 | 2 | 3 | 4 | 5 | 6 | 7 | 8 | 9 | 10 |
|---|---|---|---|---|---|---|---|---|---|---|
| $M_n$ (kg/mol) | 104 | 94 | 110 | 148 | 131 | 118 | 166 | 179 | 205 | 173 |
| $M_w/M_n$ | 1.03 | 1.49 | 1.04 | 1.36 | 1.29 | — | 1.19 | 1.28 | 1.94 | 2.10 |
| $M_p$ (kg/mol) | 108 | 107 | 114 | 115 | 115 | — | 218 | 235 | 108 | 108 |
| $T_g$ (° C.) | −38.9 | −39.1 | −39.0 | −39.0 | −39.1 | −39.5 | −40.0 | −39.5 | −39.7 | −40.0 |
| % coupling | 0 | 23.9 | 1.1 | 43.5 | 28.2 | 16.2 | 70.7 | 71.0 | 67.6 | 51.6 |
| $ML_{1+4}$ | 9.6 | 23.0 | — | 37.4 | 26.7 | — | 55.0 | 63.2 | 56.8 | 44.5 |
| $t_{80}$ (sec) | 55 | 71 | — | 86 | 73 | — | 88 | 136 | 167 | 156 |
| Cold flow (mm) | 1.9 | 2.6 | — | 2.8 | 2.5 | — | 3.3 | 4.3 | 4.6 | 4.1 |

Examples 11-19

Filled Compositions and Vulcanizates

The polymers from the Examples 1-2 and 6-10 were used to make filled compositions (compounds) using the formulation shown in Table 2a (silica as sole particulate filler). Of the materials listed in that table, N-phenyl-N'-(1,3-dimethylbutyl)-p-phenylenediamine (6PPD) acts as an antioxidant and 2,2'-dithiobis(benzothiazole) (MBTS), N-tert-butylbenzothiazole-2-sulfenamide (TBBS) and N,N'-diphenylguanidine (DPG) act as accelerators. Black oil is an extender oil that contains a relatively low amount of polycyclic aromatic compounds.

TABLE 2a

Composition for vulcanizates, silica filler

| | Amount (phr) |
|---|---|
| Masterbatch | |
| SBR interpolymer | 80 |
| natural rubber | 20 |
| silica | 52.5 |
| wax | 2 |
| 6PPD | 0.95 |
| stearic acid | 2 |
| black oil | 10 |
| Re-mill | |
| 60% disulfide silane on carrier | 5 |
| silica | 2.5 |
| Final | |
| sulfur | 1.5 |
| ZnO | 2.5 |
| MBTS | 2.0 |
| TBBS | 0.7 |
| DPG | 1.4 |
| TOTAL | 183.05 |

TABLE 2b

Composition for vulcanizates, carbon black filler

| | Amount (phr) |
|---|---|
| Masterbatch | |
| SBR interpolymer | 100 |
| carbon black (N343 type) | 50 |
| wax | 2 |
| 6PPD | 0.95 |

TABLE 2b-continued

Composition for vulcanizates, carbon black filler

| | Amount (phr) |
|---|---|
| stearic acid | 2 |
| black oil | 10 |
| Final | |
| sulfur | 1.5 |
| TBBS | 0.5 |
| DPG | 0.3 |
| MBTS | 0.5 |
| ZnO | 2.5 |
| TOTAL | 170.25 |

Table 3 below shows results of physical testing on these compounds, as well as vulcanizates prepared by curing the compounds for ~15 minutes at 171° C. (For the "Temp. sweep" line, the top row of data are from measurements at 0° C. while the bottom row are from measurements at 60° C.) Mooney viscosity data were acquired using the procedure set forth above, albeit on a filled composition (as opposed to polymer only) at the noted temperature. Tensile mechanical properties were determined using the standard procedure described in ASTM-D412; Payne effect (ΔG', i.e., the difference between G' at 0.25% strain and at 14% strain) and hysteresis (tan δ) data were obtained from dynamic experiments conducted at 60° C. and 10 Hz (strain sweep) and 2% strain and 10 Hz (temperature sweep). With respect to tensile properties, $M_X$ is modulus at x % elongation, $T_b$ is tensile strength at break, and $E_b$ is percent elongation at break.

TABLE 3

Compound and vulcanizate properties

| polymer | 11<br>Ex. 1 | 12<br>Ex. 2 | 13<br>Ex. 6 | 14<br>Ex. 7 | 15<br>Ex. 8 | 16<br>Ex. 9 | 17<br>Ex. 10 |
|---|---|---|---|---|---|---|---|
| MDR2000 @ 171° C. (final) | | | | | | | |
| ML (kg·cm) | 1.42 | 3.93 | 2.44 | 2.09 | 2.67 | 2.68 | 2.74 |
| MH (kg·cm) | 23.2 | 21.3 | 25.0 | 20.3 | 21.3 | 19.9 | 18.9 |
| $t_{90}$ (min) | 7.75 | 7.03 | 7.59 | 6.82 | 7.21 | 7.23 | 7.32 |
| $ML_{1+4}$ @ 130° C. (final) | 13.4 | 57.9 | 27.8 | 41.5 | 44.7 | 44.0 | 46.1 |
| Tensile @ 23° C. (final, unaged) | | | | | | | |
| $M_{50}$ (MPa) | 1.92 | 1.84 | 2.01 | 1.69 | 1.81 | 1.69 | 1.59 |
| $M_{200}$ (MPa) | 7.61 | 8.66 | 8.50 | 7.44 | 7.69 | 8.24 | 7.84 |
| $T_b$ (MPa) | 12.3 | 11.5 | 14.9 | 13.1 | 11.8 | 12.1 | 11.2 |
| $E_b$ (%) | 293 | 243 | 305 | 296 | 275 | 261 | 253 |
| Tensile @ 100° C. (final, unaged) | | | | | | | |
| $M_{50}$ (MPa) | 1.85 | 1.92 | 2.06 | 1.75 | 1.78 | 1.74 | 1.63 |
| $M_{100}$ (MPa) | 3.44 | 3.78 | 3.82 | 3.34 | 3.40 | 3.48 | 3.23 |
| $T_b$ (MPa) | 7.1 | 5.0 | 7.3 | 6.3 | 5.9 | 5.4 | 5.7 |
| $E_b$ (%) | 199 | 145 | 179 | 178 | 167 | 147 | 162 |
| Strain sweep (60° C., 10 Hz, final) | | | | | | | |
| G' @ 5% strain (MPa) | 3.401 | 2.618 | 3.527 | 2.316 | 2.674 | 2.464 | 2.244 |
| G" @ 5% strain (MPa) | 0.562 | 0.199 | 0.481 | 0.209 | 0.260 | 0.208 | 0.179 |
| tan δ @ 5% strain | 0.1652 | 0.0759 | 0.1363 | 0.0904 | 0.0971 | 0.0843 | 0.0797 |
| ΔG' (MPa) | 3.858 | 0.733 | 3.353 | 0.700 | 1.081 | 0.732 | 0.511 |
| Temp. sweep (2% strain, 10 Hz, final) | | | | | | | |
| G' (MPa) | 13.335 | 5.420 | 11.815 | 8.310 | 7.987 | 5.782 | 5.097 |
| | 6.664 | 3.392 | 6.356 | 4.528 | 4.415 | 3.319 | 2.939 |
| G" (MPa) | 3.983 | 1.808 | 3.609 | 2.679 | 2.524 | 1.887 | 1.682 |
| | 0.930 | 0.228 | 0.797 | 0.458 | 0.453 | 0.257 | 0.223 |
| tan δ | 0.2980 | 0.3324 | 0.3051 | 0.3218 | 0.3159 | 0.3257 | 0.3296 |
| | 0.1395 | 0.0672 | 0.1254 | 0.1011 | 0.1027 | 0.0773 | 0.0758 |
| Peak tan δ | 0.7775 | 1.0376 | 0.8008 | 0.8760 | 0.8798 | 0.9965 | 1.0576 |
| Bound rubber (%) | 11.2 | 70.5 | 22.6 | 40.9 | 44.0 | 65.8 | 74.1 |

The data of Table 3 show, inter alia, that vulcanizates employing formula (IX)-type functionalized polymers (Examples 14-17) exhibit low temperature tan δ values that are 6.0 to 10.6% higher than that of a vulcanizate employing a similar non-functionalized SBR, which predicts better wet traction performance in tire treads. Similarly, the data of Table 3 also show, inter alia, that vulcanizates employing formula (IX)-type functionalized polymers (Examples 14-17) exhibit high temperature tan δ values that are 26.4 to 45.7% lower than that of a vulcanizate employing a similar non-functionalized SBR, which predicts reduced rolling resistance in tire treads.

The data of Table 3 above also can be compared against Examples 39-42 from Table 8 of U.S. Pat. No. 8,063,153. The best high temperature tan δ performance of a silica-based vulcanizate from Table 8 was only 5.3% lower than that of a vulcanizate made from a non-functionalized version of an identical SBR whereas, as explained in the preceding paragraph, vulcanizates employing a formula (IX)-type functionalized polymer exhibited over 25% reductions in the same test. (Similar patterns can be seen by comparing other data in the two tables.)

A series of SBR interpolymers with $M_n$ values of ~250, 180, 114, 105 and 86 kiloDaltons also were prepared. The compound Mooney viscosity, tan δ, and Δ tan δ values for vulcanizates made from these as well as those from Examples 12-17 are compiled in Table 4.

Vulcanizates similar to Examples 14 and 16 were prepared with the exception that the epoxide compounds were not reacted with the thiolate polymers and, instead, merely added to the masterbatch of an SBR interpolymer bearing terminal thiol functionality, i.e., blended as opposed to attached. These are designated Examples 18 and 19, and their compound Mooney viscosity and Δ tan δ values also are compiled in Table 4.

TABLE 4

Properties of vulcanizates

|  |  | $ML_{1+4}$ @ 130° C. | tan δ | Δ tan δ |
|---|---|---|---|---|
| SBR (250) | A, B | 67.7 | 0.1057 | 0.0558 |
| SBR (180) | A, B | 35.7 | 0.1297 | 0.0662 |
| SBR (114) | A, B | 15.5 | 0.1552 | 0.0807 |
| SBR (105) | A, B | 13.4 | 0.1652 | 0.0819 |
| SBR (86) | A, B | 9.3 | 0.1774 | 0.0879 |
| Example 12 | A, B | 55.5 | 0.0865 | 0.0273 |
| Example 13 | A, B | 27.8 | 0.1363 | 0.0663 |
| Example 14 | A | 47.5 | 0.0872 | 0.0216 |
| Example 15 | A | 44.7 | 0.0971 | 0.0300 |
| Example 16 | A | 44.0 | 0.0843 | 0.0218 |
| Example 17 | A | 46.1 | 0.0797 | 0.0160 |
| Example 18 | B | 26.4 | — | 0.0722 |
| Example 19 | B | 29.8 | — | 0.0636 |

For the A-designated rows, plots were made of the data of the middle column against the data of the left column (i.e., tan δ vs. compound Mooney viscosity) and of the data of the right column against the data of the middle column (Δ tan δ vs. tan δ). For both plots, the five SBR interpolymer data were used to draw best-fit lines. The Example 12 comparative and Examples 14-17 data all fall well below the comparative line, thereby indicating superior performance relative to non-functionalized SBR interpolymers or even the Example 13 comparative.

Similarly, for the B-designated rows, a plot was made of the data of the right column against the data of the left column (Δ tan δ vs. compound Mooney viscosity) and, again, the five SBR interpolymer data were used to draw best-fit lines. Here, the Example 12 comparative was the only one that fell well below the baseline, thereby indicating the Examples 18-19 comparatives (blends) did not perform similarly to their reacted counterparts (Examples 14 and 16, respectively).

Examples 20-23

Further Reaction of Epoxide Functionalities

The procedure from Example 1 again was essentially repeated. To the same type of reactor was added 1.75 kg hexane, 0.45 kg styrene solution, and 2.75 kg butadiene solution (21.8% in hexane). The reactor was charged with ~3.9 mL n-butyllithium solution, followed by 1.2 mL 2,2-bis(2'-tetrahydrofuryl)propane solution. The reactor jacket was heated to 50° C. and, after ~30 minutes, the batch temperature peaked at ~63° C.

After ~30 minutes, a solution of 0.36 mL ethylene sulfide (16.8 M) in 10 mL THF was charged to the reactor and stirred at 50° C. for an additional 20 minutes, followed by ~6.5 mL DGCGOA (1.0 M in toluene) with an additional ~20 minutes of stirring at the same temperature.

Portions of the polymer cement were dropped into glass bottles containing, respectively
sample 20—isopropanol,
sample 21—4.3 M APTEOS,
sample 22—3.0 M AHAMTEOS, and
sample 23—6.8 M EDOEA.
(The amounts of functional terminating compounds were calculated to provide a 1:1 molar ratio of functional terminator compound to Li initiator.) The bottles were placed in a 50° C. water bath for ~40 minutes.

Each polymer cement was coagulated and drum dried as in Examples 1-2. Properties of these polymers also are summarized below in Table 5.

TABLE 5

Properties of polymers from Examples 20-23

|  | 20 | 21 | 22 | 23 |
|---|---|---|---|---|
| $M_n$ (kg/mol) | 152 | 150 | 53 | 108 |
| $M_w/M_n$ | 1.22 | 1.21 | 3.05 | 1.65 |
| $M_p$ (kg/mol) | 213 | 212 | 214 | 213 |
| $T_g$ (° C.) | −36.5 | −36.9 | −39.6 | −36.8 |
| % coupling | 65.3 | 66.7 | 56.5 | 62.6 |
| $ML_{1+4}$ | 43.2 | 43.2 | 49.2 | 41.0 |
| $t_{80}$ (sec) | 1.3 | 1.3 | 1.5 | 1.3 |

Examples 24-32

Filled Compositions and Vulcanizates

The polymers from the Examples 20-23 were used to make filled compositions using the formulation shown above in Tables 2a (silica as sole particulate filler) and 2b (carbon black as sole particulate filler). Table 6 below shows results of physical testing (compound Mooney viscosity at 130° C., tan δ, and Δ tan δ values) on vulcanizates prepared by curing these compounds for ~15 minutes at 171° C., as well as for a series of vulcanizates incorporating non-functionalized SBR interpolymers with $M_a$ values of ~250, 180, 167, 104 and 86 kiloDaltons (Examples 28-32).

TABLE 6

Properties of vulcanizates

|  |  | Silica | | | Carbon black | | |
|---|---|---|---|---|---|---|---|
|  | Polymer | $ML_{1+4}$ | tan δ | Δ tan δ | $ML_{1+4}$ | tan δ | Δ tan δ |
| Ex. 24 | Ex. 20 | 40.7 | 0.0964 | 0.0218 | 42.8 | 0.1500 | 0.0542 |
| Ex. 25 | Ex. 21 | 43.1 | 0.0881 | 0.0183 | 46.0 | 0.1492 | 0.0556 |
| Ex. 26 | Ex. 22 | 49.6 | 0.0869 | 0.0217 | 53.5 | 0.1322 | 0.0401 |
| Ex. 27 | Ex. 23 | 48.9 | 0.0900 | 0.0235 | 51.8 | 0.1362 | 0.0425 |
| Ex. 28 | SBR (250) | 67.7 | 0.1057 | 0.0558 | 92.7 | 0.1359 | 0.0637 |
| Ex. 29 | SBR (180) | 35.7 | 0.1297 | 0.0662 | 50.9 | 0.1714 | 0.0832 |
| Ex. 30 | SBR (167) | 15.5 | 0.1552 | 0.0807 | 21.6 | 0.2361 | 0.1256 |
| Ex. 31 | SBR (104) | 13.4 | 0.1652 | 0.0819 | 17.9 | 0.2495 | 0.1325 |
| Ex. 32 | SBR (86) | 9.3 | 0.1774 | 0.0879 | 13.0 | 0.2686 | 0.1430 |

Plots of tan δ vs. compound Mooney viscosity for both types of vulcanizates, again using the five SBR interpolymer data (Examples 28-32) to draw best-fit lines, show that the Examples 24-27 vulcanizates all fall well below the comparative line, thereby indicating superior hysteresis performance relative to vulcanizates employing non-functionalized SBR interpolymers.

That which is claimed is:

1. A method for providing a polymer that comprises terminal functionality and a sulfide linkage, said method comprising:
   a) providing a living polymer that comprises polyene mer,
   b) introducing to said living polymer an episulfide so as to provide a polymer with a terminal thiolate moiety, said episulfide being provided in no more than a stoichiometric amount, and
   c) introducing to said polymer with a terminal thiolate moiety an epoxide that comprises at least one heteroatom-containing functional group, said epoxide being provided in at least a stoichiometric amount, said epoxide reacting with said thiolate moiety so as to provide terminal functionality with a hydroxyl group at the β position relative to the S atom of said thiolate moiety, thereby providing said polymer with said terminal functionality and said sulfide linkage.

2. The method of claim 1 wherein an alkoxysilane group constitutes at least one of said at least one heteroatom-containing functional group.

3. The method of claim 1 wherein an additional epoxy group constitutes at least one of said at least one heteroatom-containing functional group.

4. The method of claim 3 further comprising said additional epoxy group is reacted with an epoxy-reactive compound.

5. The method of claim 1 wherein said epoxide has the general formula

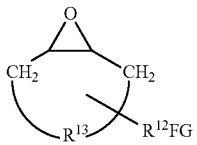

where
   FG is a heteroatom-containing functional group,
   $R^{12}$ is a hydrocarbylene group, optionally substituted with at least one of one or more heteroatoms and one or more heteroatom-containing functional groups, and
   $R^{13}$ is a substituted or unsubstituted $C_1$-$C_4$ alkylene group.

6. The method of claim 5 wherein said $R^{13}$-containing ring comprises a heteroatom.

7. A terminally functionalized polymer of the formula E-A-$G_t$ where E is a polymer that contains polyene mer, A is an intermediate segment that comprises a sulfur atom at the end distal from E, and $G_t$ is the radical of an epoxide that comprises a hydroxyl group at the β position relative to said sulfur atom and at least one heteroatom-containing functional group distal therefrom.

8. The terminally functionalized polymer of claim 7 wherein an alkoxysilane group constitutes at least one of said at least one heteroatom-containing functional group.

9. The terminally functionalized polymer of claim 7 wherein an epoxy group constitutes at least one of said at least one heteroatom-containing functional group.

10. A terminally functionalized polymer of the formula E-A-$G_e$-$G_r$ where E is a polymer that contains polyene mer, A is an intermediate segment that comprises a sulfur atom at the end distal from E, $G_e$ is the radical of a polyepoxide that comprises a hydroxyl group at the β position relative to said sulfur atom, and $G_r$ is the radical of a compound that comprises an epoxy-reactive group and at least one heteroatom-containing functional group.

11. The terminally functionalized polymer of claim 10 wherein an alkoxysilane group constitutes at least one of said at least one heteroatom-containing functional group.

12. The terminally functionalized polymer of claim 10 wherein an epoxy group constitutes at least one of said at least one heteroatom-containing functional group.

13. The terminally functionalized polymer of claim 10 wherein said epoxy-reactive group is —$NH_2$.

14. The terminally functionalized polymer of claim 10 wherein said epoxy-reactive group is —SH.

15. The terminally functionalized polymer of claim 10 wherein said epoxy-reactive group is —OH.

* * * * *